United States Patent [19]

Terada

[11] Patent Number: 4,663,925

[45] Date of Patent: May 12, 1987

[54] FRUIT HARVESTING ROBOT HAND

[75] Inventor: Takashi Terada, Izumi, Japan

[73] Assignee: Kubota, Ltd., Osaka, Japan

[21] Appl. No.: 661,992

[22] Filed: Oct. 18, 1984

[30] Foreign Application Priority Data

Mar. 19, 1984 [JP] Japan .................................. 59-52992

[51] Int. Cl.⁴ .............................................. A01P 46/24
[52] U.S. Cl. .................................... 56/328 R; 56/10.2;
414/730; 901/9; 901/46
[58] Field of Search ...................... 56/328 R, 332–340,
56/10.2, DIG. 15; 414/730, 555, 5, 6; 406/168;
901/2, 9, 46

[56] References Cited

U.S. PATENT DOCUMENTS

| | | | |
|---|---|---|---|
| 3,566,594 | 3/1971 | Ellis | 56/328 R |
| 3,591,949 | 7/1971 | Connery | 56/332 |
| 3,854,273 | 12/1974 | Rosenberg | 56/336 |
| 4,202,158 | 5/1980 | Edwards | 56/328 R |
| 4,208,860 | 6/1980 | Edwards | 56/328 R |
| 4,519,193 | 5/1985 | Yoshida et al. | 56/328 R |

Primary Examiner—Robert J. Spar
Assistant Examiner—D. Glenn Dayoan
Attorney, Agent, or Firm—Edwin E. Greigg

[57] ABSTRACT

The disposed fruit harvesting robot comprises fruit detecting sensors arranged around an opening of a cylindrical case for taking in fruit. The case also includes at least one additional sensor disposed inside the case.

15 Claims, 21 Drawing Figures

FRUIT HARVESTING ROBOT HAND

BACKGROUND OF THE INVENTION (1) Field of the Invention

This invention relates to a fruit harvesting robot hand, and more particularly to a fruit harvesting robot hand comprising a cylindrical case for taking in fruit provided with a plurality of fruit detecting sensors around an opening thereof.

(2) Description of the Related Art

Figure 4:
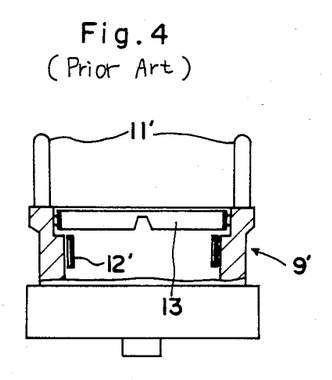

An example of known fruit harvesting robot hand is shown in FIG. 4 of the accompanying drawings, which robot hand has been proposed by present Applicant and is disposed in Japanese Patent Application No. 58-144586. The illustrated construction includes a cylindrical case 9' for taking in fruit provided with a plurality of fruit detecting contact sensors 11' around an opening thereof to obtain information on the basis of which the robot hand is operated to bring the case 9' to a position to each an objective fruit. The robot hand is positionally adjusted in response to the information provided by the plurality of contact sensors 11' regarding its position relative to the objective fruit, and the fruit is captured when the fruit is in position centrally of the opening of the cylindrical case 9'.

However, where fruits are growing very close to one another, this prior art construction has the contact sensors 11' come into contact with not only an objective fruit but also other adjacent fruits at the same time, whereby the objective fruit cannot be discriminated from the other fruits and thus an operational error occurs. In other words, the prior art construction has a disadvantage of lacking in precision in guiding the robot hand to a proper position relative to the objective fruit or of poor working efficiency even if the robot hand is guided to a proper position.

SUMMARY OF THE INVENTION

This invention has been made having regard to the state of the art noted above, and its object is to provide a fruit harvesting robot hand comprising means to detect an objective fruit in a reliable manner even where fruits grow close to one another.

In order to achieve the above object, the robot hand according to this invention comprises a fruit intake case including at least one additional fruit detecting sensor disposed inside.

More particularly, the fruit harvesting robot hand according to this invention is effective to discriminate the objective fruit from other fruits by combining information obtained by the fruit detecting sensors around the opening of the fruit intake case and information obtained by the additional fruit detecting sensor inside the case or by giving priority to the information obtained by the latter.

The invention has an advantage that, even where fruits are growing very close to one another, the robot hand is guided such that only an objective fruit is placed in position centrally of the opening of the fruit intake case, in response to both a fruit detection signal provided by the sensors around the opening of the case and a fruit detection signal provided by the sensor inside the case. Therefore, an operational error hardly occurs with the robot hand of this invention.

Other objects and advantages of this invention will be apparent from the following description.

BRIEF DESCRIPTION OF THE DRAWINGS

The drawings illustrate fruit harvesting robot hands according to this invention, in which FIGS. 1 to 4 pertain to a first embodiment, FIG. 1 being a side elevation of a fruit harvester, FIG. 2 being a view in vertical section of a robot hand, FIGS. 3a and 3b being plan views of the robot hand, respectively, and FIG. 4 being a view in vertical section of a prior art robot hand, and FIGS. 5 to 17 pertain to a second embodiment, FIGS. 5 and 6 being plan views of the robot hand, respectively, FIG. 7 being a view in vertical section of a mounting structure for first and second contact sensors, FIG. 8 being a partly broken away side view showing an interlocking structure between the first and second contact sensors and an air cylinder, FIG. 9 being a side view in vertical section of the robot hand, FIGS. 10 and 11 being a side view showing an interlocking structure between a cutter and an air cylinder, respectively, FIG. 12 being a schematic view of a control system, FIG. 13 being a perspective view of a distance sensor, FIG. 14 being a flow chart of a control operation, FIGS. 15a and 15b being flow sharts of a harvesting operation, and FIGS. 16a, 16b, 17a and 17b being schematic views showing image variations occurring with directional adjustments, respectively.

DESCRIPTION OF THE PREFERRED EMBODIMENTS

Figure 1:
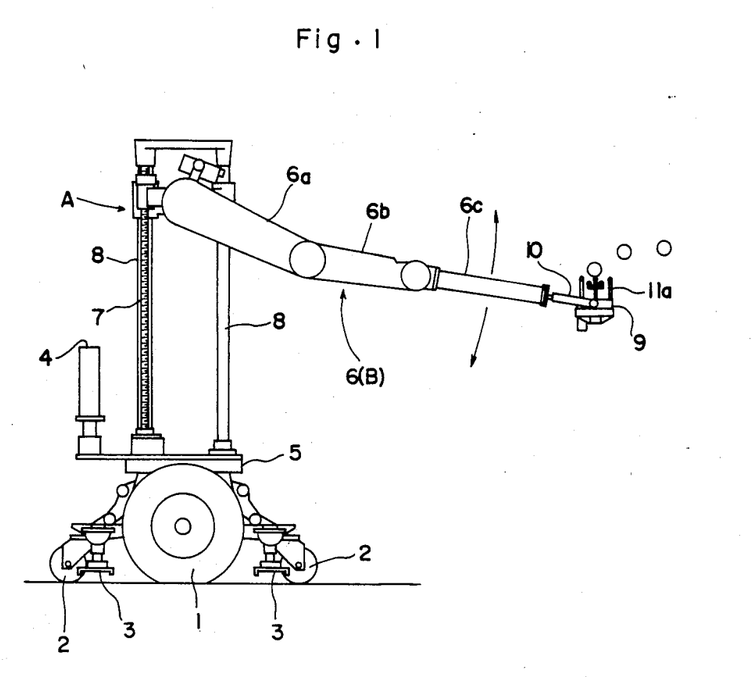

Referring to FIG. 1, a fruit harvester comprises a base frame having a pair of right and left drive wheels 1, a pair of front and back free wheels 2, and a plurality of vertically movable outriggers 3. A swivel deck 5 is mounted on the base frame to be driven by an electric motor 4. The swivel deck 5 carries a vertically movable lift device A disposed at a swivel axis thereof, and the lift device A in turn carries a fruit harvesting robot hand B.

The lift device A includes a screw member 7 rotatable by means of an electric motor or the like and guide members 8 providing a vertical track along which the lift device A moves up and down. Thus the robot hand B connected at a base end thereof to the lift device A is raised and lowered by opposite rotations of the screw member 7.

As shown in FIGS. 1 to 3a and 3b, the fruit harvesting robot hand B comprises an articulated arm assembly 6 including a first arm 6a connected to the lift device A to be vertically oscillatable, a second arm 6b connected to the first arm 6a to be vertically oscillatable, and a third arm 6c connected to the second arm 6b to be vertically oscillatable, the third arm 6c carrying a bifurcated support frame 10 pivoted to an extreme end thereof to be freely rotatable about an axis Y extending longitudinally of the arm 6c, the support frame 10 carrying a cylindrical case 9 for taking in fruit pivoted thereto to be freely oscillatable about a horizontal axis X. The case 9 has a plurality of contact sensors 11a extending upwardly from a periphery of an opening thereof to detect a position of fruit to be harvested. The case 9 further includes a plurality of fruit pressing members 12 arranged in a peripheral direction thereof, the fruit pressing members 12 being switchable between a position retracted in the case 9 and a position projecting from the case 9 to cover the fruit to be harvested. An arcuate cutter 13 is pivoted at respective ends thereof to the case 9 to be projectable and retractable together with the fruit pressing members 12, for cutting a calyx of the fruit or the part that connects the fruit to a branch.

Figure 2:
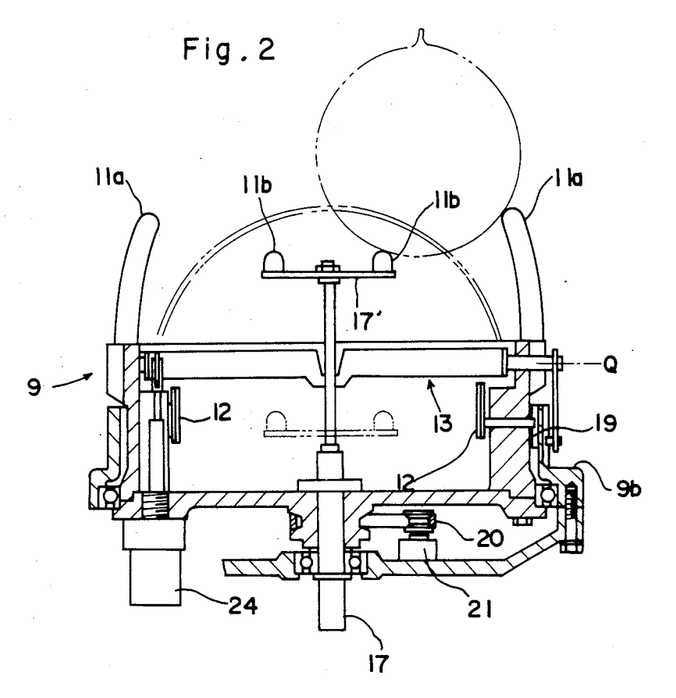
Figure 3A:
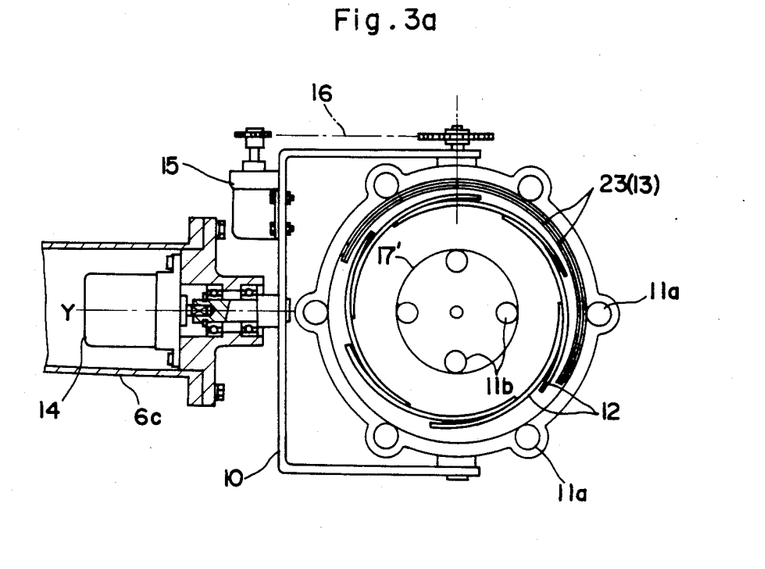
Figure 3B:
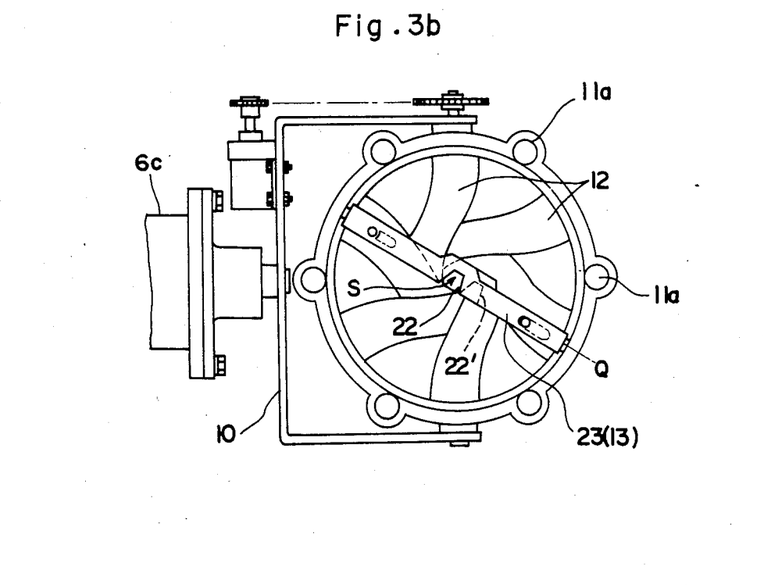

The bifurcated support frame 10 is not only freely rotatable about the axis Y of the third arm 6c but is also rotated and stopped by a motor 14 having an electromagnetic clutch and an encoder for detecting its rotation. Similarly, the case 9 is not only freely rotatable relative to the bifurcated support frame 10 about the axis X but is rotated and stopped by a motor 15 having an electromagnetic clutch and an encoder, torque of the motor 15 being transmitted thereof by a belt means 16.

The case 9 further includes a plurality of contact sensors 11b disposed inside the case 9. These contact sensors 11b are similar in construction to the foregoing contact sensors 11a and extend upwardly from adjacent to a periphery of a disc 17' vertically movable at a center of the case 9 by means of an air cylinder 17. Top ends of these sensors 11b inside the case 9 are located below top ends of the sensors 11a around the opening of the case 9 when the sensors 11b inside are raised to their upper limit of movement.

When the contact sensors 11a provided peripherally of the case 9 contact a fruit, information is provided to move the case 9 in a horizontal direction away from the fruit. And when the contact sensors 11b inside the case 9 contact the fruit, information is provided to raise the case 9 and cause the fruit pressing members 12 to project from the case 9 to take the fruit into the case 9.

The cylindrical case 9 is brought to a height suited for picking the objective fruit from a sideways direction by operating the articulated arm assembly 6 or the lift device A. In parallel with this the position of the case 9 is adjusted in accordance with detection signals from the contact sensors 11a and 11b whereby the fruit is placed centrally of the opening of the case 9.

More particularly, the case 9 is first adjusted in respect of its horizontal position relative to the objective fruit on the basis of detection signals provided by the contact sensors 11a around the opening of the case 9. Then the contact sensors 11b inside the case 9 contact the fruit which may take place after or in the course of the horizontal adjustment of the case 9, and in the latter case the horizontal adjustment is stopped. Upon detection of the fruit by the contact sensors 11b, the air cylinder 17 is actuated to lower the contact sensors 11b inside the case 9, and then the case 9 is raised until the contact sensors 11b inside the case 9 come into contact with the fruit again.

Thereafter the fruit pressing members 12 are caused to project from the case 9 to cover the objective fruit, and the cutter 13 is actuated to cut its calyx. The fruit is then ready for collection.

Each of the fruit pressing members 12 comprises a curved strip pivoted at a base end thereof to be oscillatable in and out of the case 9. When in the projecting position free end portions of adjacent pressing members 12 lie one on top of the other and define a space S for receiving the calyx of the fruit. The fruit pressing members 12 are oscillatable on axes radially of the case 9 and have such a length that the adjacent end portions thereof overlap respective adjacent pressing members 12 in the retracted position as well as during the oscillation.

A mechanism for oscillating the fruit pressing members 12 comprises a cylindrical member 9b fitted about the case 9 to be rotatable circumferentially of the case 9, the cylindrical member 9b defining vertical slits 19 for receiving engaging pins 18 provided at the base ends of the pressing members 12, respectively. This mechanism further comprises a motor 21 for rotating the cylindrical member 9b by utilizing a belt 20. Thus, the fruit pressing members 12 are oscillated in and out of the case 9 by opposite rotations of the cylindrical member 9b.

The cutter 13 comprises a pair of arcuate blade strips 23 and 23' defining recessed blade portions 22 and 22' at longitudinally intermediate portions thereof, respectively. The blade strips 23 and 23' are longitudinally movable relative to each other to cut the calyx of fruit. The cutter 13 is pivoted at respective ends thereof to be oscillatable about an axis Q radially of the case 9. Thus the cutter 13 is oscillatable in and out of the case 9, and is adapted to assume the projecting position only when the calyx is cut.

The pair of blade strips 23 and 23' are supported to be movable relative to each other such that an outer strip 23 is pivotally connected at both ends thereof and an inner strip 23' defines a pin receiving slot extending longitudinally at one end thereof. An air cylinder 24 is provided to pull at the other end of the inner blade strip 23' causing the inner blade strip 23' to slide longitudinally relative to the stationary outer blade strip 23.

The described robot hand may be modified in varied ways, as follows:

The fruit pressing members 12 in the form of curved strips may be replaced by arcuate elastic wires or the like, or by other means such as a member having a curved section and movable in and out of the case 9.

The mechanism for oscillating the fruit pressing members 12 comprising the rotatable cylindrical member 9b, the slits 19 defined therein and the engaging pins 18, may be modified to comprise a gearing device such as rack and pinion means to directly rotate or drive in and out the base ends of the fruit pressing members 12.

The cutter 13 too may be modified such that its cutting action is carried out by a pivotal movement about the axis Q instead of the relative sliding movement of the outer and inner blade strips 23 and 23'. Further, the cutter 13 may be driven to project from the case 9 by the rotation of the cylindrical member 9b or by a drive mechanism specifically provided for the purpose, this drive mechanism per se being variable in many ways.

The plurality of contact sensors 11b mounted inside the case 9 may be replaced by a single sensor movable along a central axis thereof.

The air cylinder 17 for moving the contact sensors 11b inside the case 9 may be replaced by other means such as a motor adapted to stop the sensors 11b at any desired position. Then the sensors 11b may be used also to detect that the fruit has been taken into the case 9 or to detect that the calyx has been cut.

According to the first embodiment so far described, the fruit intake case has a bottom closed by the contact sensors and therefore fruit cannot be recovered therefrom through the bottom. As a result, it is necessary to turn the case upside down to discharge the harvested fruit therefrom. This has a disadvantage of not only lowering harvesting efficiency but also complicating the entire constructed with an additional mechanism required for turning the case upside down.

The embodiment to be described hereinafter is adapted to take fruit out of a cylindrical case through a bottom thereof to help toward simplicity of construction.

To this end, the second embodiment comprises a first fruit detecting sensor switchable between an operative position directly over an opening of a cylindrical case for taking in fruit and an inoperative of retracted position outwardly of the case, a second fruit detecting sensor switchable between an operative position inside the case and an inoperative or retracted position outwardly of the case, and an actuator operatively connected to both first and second sensors to selectively move the sensors to their respective operative positions.

More particularly, there are provided a first contact sensor for detecting presence of a fruit directly over an opening of the cylindrical fruit intake case and a second contact sensor for detecting presence of a fruit in the case, and each of these sensors is retractable to an inoperative position outwardly of the case. This construction permits the fruit detection to be carried out as desired and the harvested fruit to be recovered from the bottom of the case.

The two sensors are moved by the single actuator by utilizing the fact that desired detections are carried out and the fruit is recovered from the bottom of the cylindrical case by selectively bringing the fruit and second contact sensors to their respective operative positions.

Thus, the feature of moving the two sensors by means of the single actuator helps toward a simple construction which permit the fruit to be recovered from the bottom of the cylindrical fruit intake case. A fruit harvesting robot hand according to the second embodiment which is convenient in use will be particularly described hereinafter.

Figure 12:
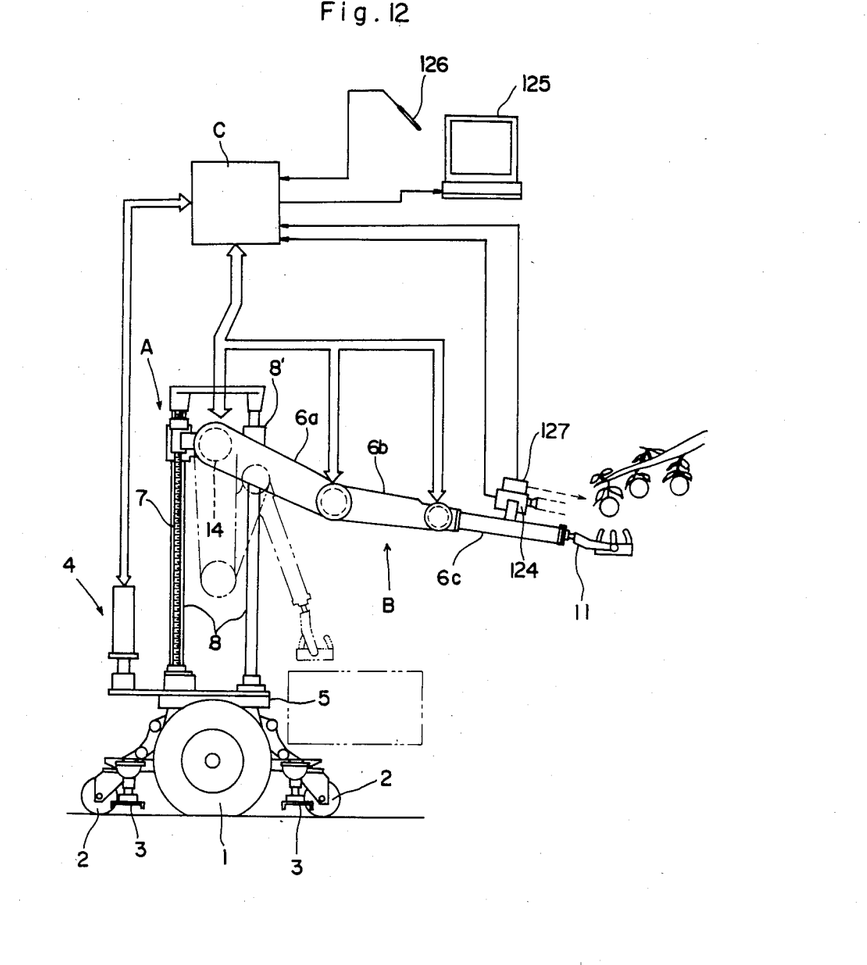

Referring to FIG. 12, a fruit harvester comprises a base frame having a pair of right and left drive wheels 1, a pair of front and back free wheels 2, and a plurality of vertically movable outriggers 3. A swivel deck 5 mounted on the base frame carries a lift device A disposed at a swivel axis thereof, and the lift device A carries a fruit harvesting robot hand B. Reference numeral 4 denotes an electric motor for driving the lift device 5 and the swivel deck 4.

The lift device A includes a rotatable screw member 7 and guide members 8. Thus the robot hand B connected at a base end thereof to the lift device A is raised and lowered by opposite rotations of the screw member 7 along a track provided by the guide members 8.

The fruit harvesting robot hand B comprises a guide element 8' at the base end thereof vertically movably supported by the lift device A, a first arm 6a vertically oscillatably supported by the guide element 8', a second arm 6b vertically oscillatably supported by the first arm 6a, a third arm 6c vertically oscillatably supported by the second arm 6b, and a hand element H connected to an extreme end of the third arm 6c. An electric motor 14 having an encoder is provided to oscillate each of the arms 6a, 6b and 6c to guide the hand element H to an objective fruit to harvest the fruit.

Referring to FIGS. 5 to 11, the hand element H comprises a bifurcated support frame 10 attached to the extreme end of the third arm 6c to be rotatable about an axis Y extending longitudinally of the third arm 6c, and a cylindrical fruit intake case 112 having a tip opening and attached to extreme ends of the bifurcated frame 10 to be rotatable about a horizontal axis X. The whole hand element H is maintained in an upwardly opening posture by gravity.

Figure 5:
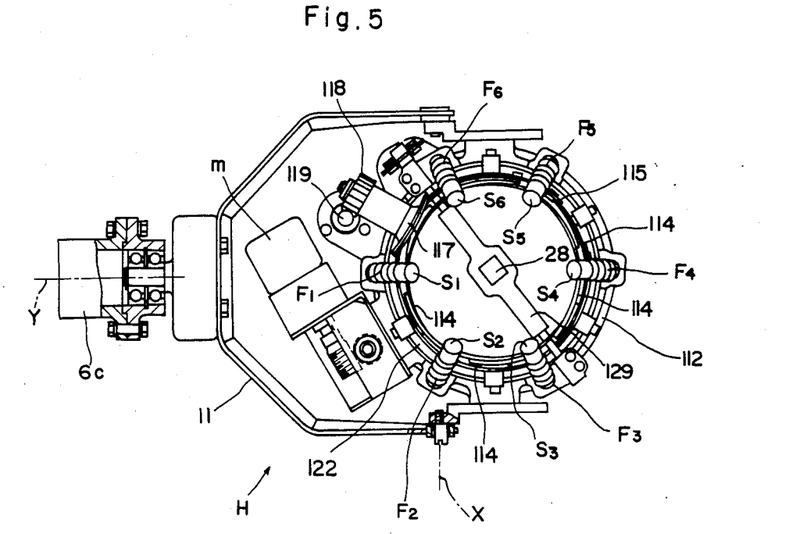
Figure 6:
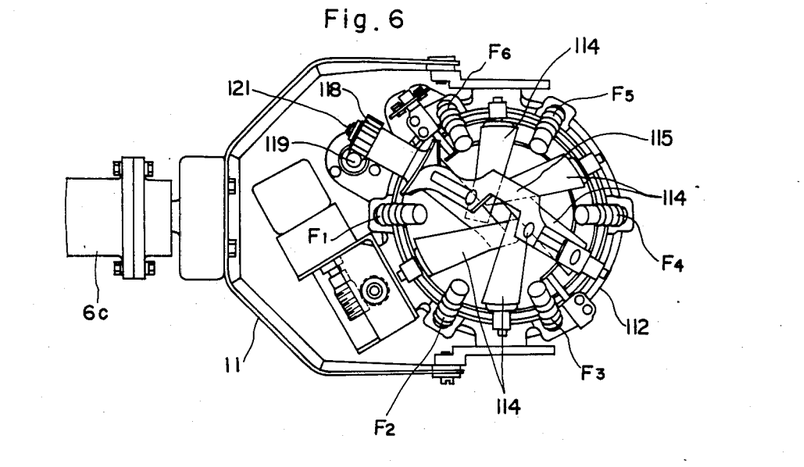
Figure 9:
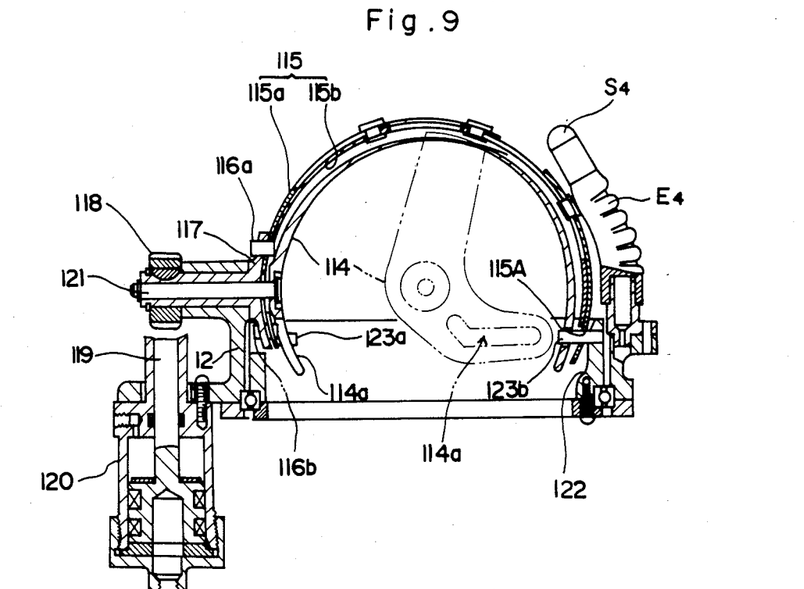

The cylindrical case 112 includes six calyx pressing members 114 switchable between a position projecting from the case 112 and a position retracted in the case 112 and adapted, when projecting from the case 112, to press and hold in position a calyx of the fruit present in the case 112, and an arcuate slide cutter 115 also switchable between a position projecting from the case 112 and a position retracted in the case 112 and adapted, when projecting from the case 112, to cut the calyx held in position by the calyx pressing members 114.

As particularly described later, the fruit harvesting hand element H is brought to a position below an object fruit and is then raised to take the fruit into the cylindrical case 112. In this state the calyx pressing members 114 are caused to project from the case 112 to hold the calyx in position and the cutter 115 is actuated to cut the calyx whereby the fruit is harvested.

The cylindrical case 112 further includes a first to a sixth rubber fingers F1 to F6 arranged around the top opening of the case 112, the fingers F1 and F6 being elastically bendable inwardly of the opening by air supplied thereinto. By adjusting the air supply to the fingers F1 to F6, the size of a fruit inlet passage defined by tip ends of the fingers F1 to F6 is varied to suit the fruit to be harvested.

Figure 10:
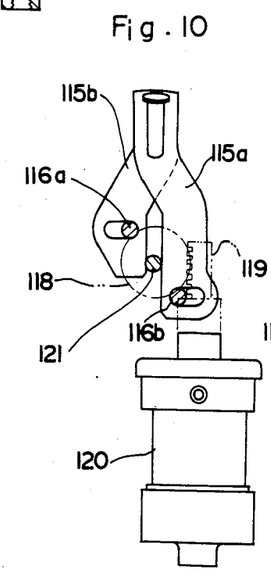
Figure 11:
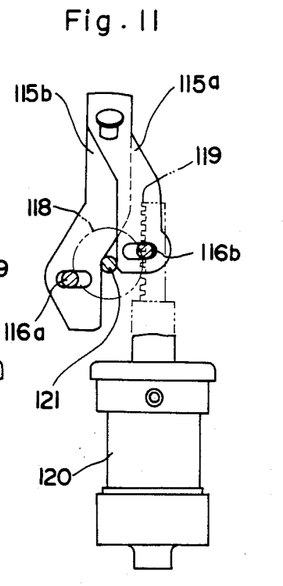

The cutter 115 comprises a pair of arcuate blade strips 115a and 115b arranged one over the other and interconnected by pins to be slidable relative to each other. Each of the blade strips 115a and 115b defines a cutting recess at a mid-position longitudinally thereof to receive a calyx of fruit.

There is a pair of pins 116a and 116b each engaging one end of the blade strip 115a or 115b and attached to a cutter actuating member 117 rotatably mounted in the cylindrical case 112. The cutter actuating member 117 carries a pinion 118 at an outward end thereof, which pinion 118 is in mesh with a rack 119 connected to an air cylinder attached to the cylindrical case 112. Thus the air cylinder 120 is operable to cause the two blade strips 115a and 115b to slide relative to each other to cut the calyx.

Reference numeral 121 denoted a cutter support pin which also acts as a pivot pin for calyx pressing member 114. When oscillating the cutter 115 in and out of the case 112, the air cylinder 120 is extended and retracted with oscillations of the cutter 115 while being maintained in communication with ambient air.

A mechanism for oscillating the calyx pressing members 114 and the cutter 115 in and out of the case 112 comprises a cylindrical member 122 fitted in the cylinderical fruit intake case 112 and rotatable back and forth by means of an electric motor m. The cylindrical member 122 has pins 123a in engagement with slots 114a defined in the calyx pressing members 114, and a pin 123b in engagement with a slot 115A defined in the end of the cutter 115 opposite the described mechanism for sliding the cutter 115 (the pin 123b acting also as a pin for operating calyx pressing member). Thus the calyx pressing members 114 and the cutter 115 are oscillatable in and out of the cylindrical case 112 by rotations of the cylindrical member 122.

Each of the slots 114a and 115A is defined such that the calyx pressing members 114 assume a completely projecting position.

Means for automatically guiding the fruit harvesting hand element H to a position below a fruit to be harvested will be particularly described hereinafter.

As shown in FIG. 12, the third arm 6c carries on an upper portion thereof a TV camera 124 acting as means to pick up fruit to be harvested or recognize a direction in which the objective fruit lies. The system further includes a monitor 125 to display an image picked up by the camera 124, and a light detection means 126 for selecting the objective fruit from among the fruits shown on the monitor 125. The third arm 6c also carries on an upper portion thereof an infrared ray emitting spot distance sensor 127 for detecting approach of the fruit harvesting hand element H within a predetermined distance from the objective fruit. A control circuit C outputs control instructions based on detection signals from the above element, information regarding rotations of the arm actuating motor 14 and the swivel deck 5, information relating a vertical position of the lift device A, and control data stored in advance.

Figure 14:
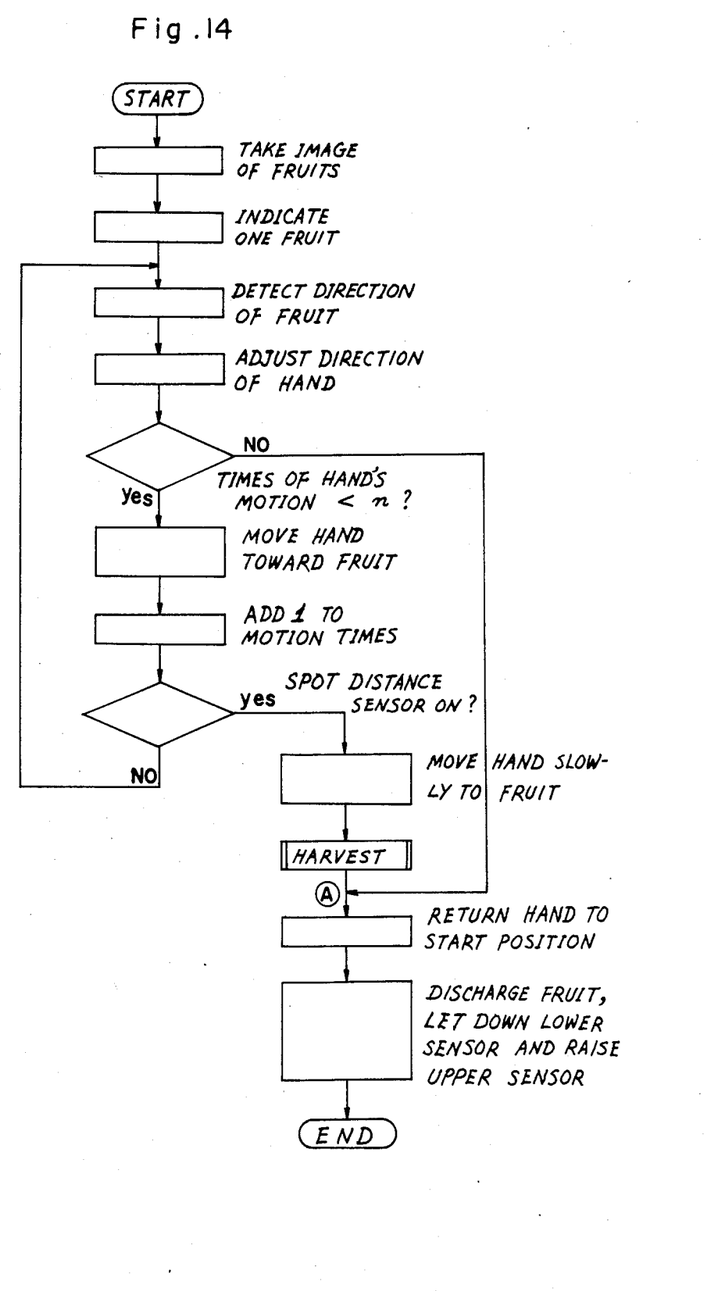

More particularly, as shown in the flow chart of Fig. 14, the TV camera 124 picks up fruits and the fruit to be harvested is indicated by the light detector 126. Then a direction in which the objective fruit lies in obtained by a logical and arithmetic processing, and the TV camera 124 is directed to the objective fruit. In other words, the hand element H is moved in a controlled manner toward the objective fruit by operating the swivel deck 5, the lift device A or the arms 6a, 6b and 6c. Next, the hand element H is moved predetermined distances by extending the arms 6a, 6b and 6c. Each time the hand element H is moved a predetermined distance, a direction of the objective fruit is determined by a logical and arithmetic processing to move the hand element H in the resulting direction. When the spot distance sensor 127 provides a detection signal, the hand element H is brought slowly toward the objective fruit and thereafter the hand element H carries out the harvesting action as described hereinbefore.

However, where the spot distance sensor 127 does not detect the fruit after the hand element H is moved the predetermined distance a predetermined number of times n, the hand element H is returned to a predetermined position for starting a next cycle. The predetermined number of times n may by an amounted of arm extension divided by the predetermined distance.

Figures 7, 8, 13:
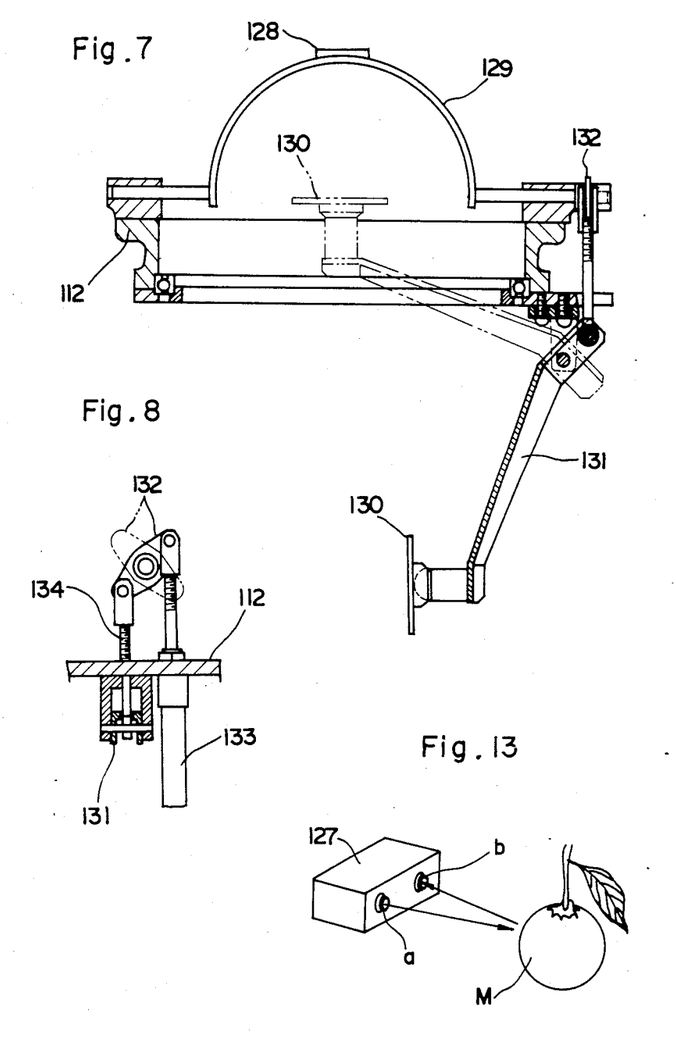

As shown in FIG. 13, the spot distance sensor 127 includes a light emitter a and a light receiver b for detecting light emitted by the light emitter a and reflected by the fruit M. The sensor 127 determines the distance on the basis of an amount of light received by the light receiver b.

Figure 16A:
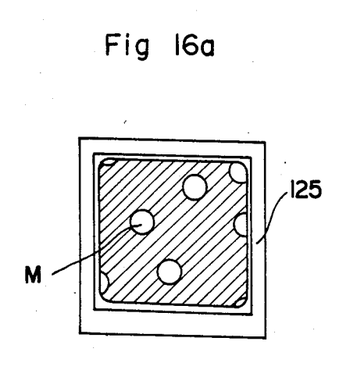
Figure 16B:
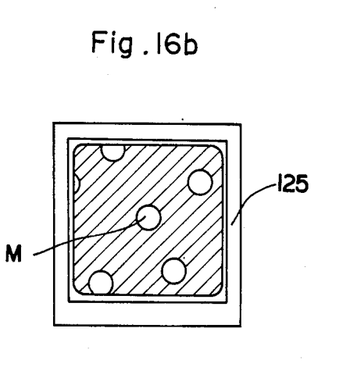
Figure 17A:
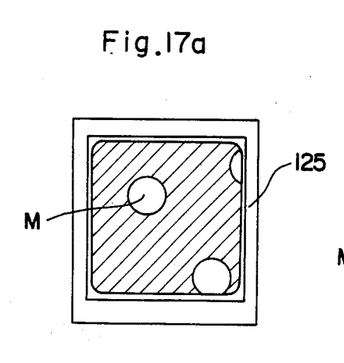
Figure 17B:
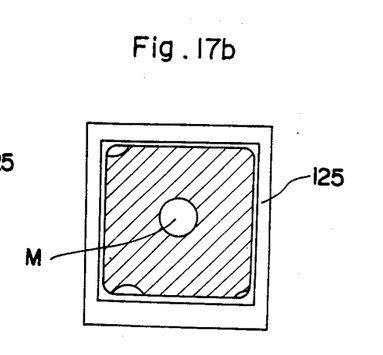

FIGS. 16a and 16b show a change in the image shown on the monitor 125 occurring with a directional adjustment while the hand element H is placed in a desired position. FIGS. 17a and 17b show a change in the image shown on the monitor 125 occurring with a directional adjustment while the hand element H is moved toward the objective fruit M.

Harvester controls will be described next.

The first to sixth fingers F1 to F6 include a first to sixth contact sensors S1 to S6 mounted at tip ends thereof, respectively, for detecting fruit. Further, a first fruit detecting contact sensor (hereinafter referred to as upper sensor) 128 is mounted on an arcuate support bracket 129 attached to the cylindrical case 112 to be oscillatable in and out of the case 112. The upper sensor 128 is in an operative postion directly over the opening the cylindrical case 112 when the bracket 129 is in a position fully projecting from the case 112, and assumes as inoperative retracted position outwardly of the case 112 when the bracket 129 oscillates downwardly. A second fruit detecting contact sensor (hereinafter referred to as lower sensor) 130 is mounted on an oscillatable arm 131 attached to the cylindrical case 112 to be vertically oscillatable. The lower sensor 130 is in an operative position inside the cylindrical case 112 when the oscillatable arm 131 projects into the case 112, and assumes an inoperative retracted position outwardly of the case 112 when the oscillatable arm 131 oscillates downwardly. A relay arm 132 oscillatable in unison with the upper sensor 128 is connected to an air cylinder 133 attached to the cylindrical case 112, the relay arm 133 being operatively connected to the oscillatable arm 131 carrying the lower sensor 130 through a push-pull rod 124. Thus the air cylinder 133 is operable to selectively bring the two sensors 128 and 130 to their respective operative positions.

Figure 15A:
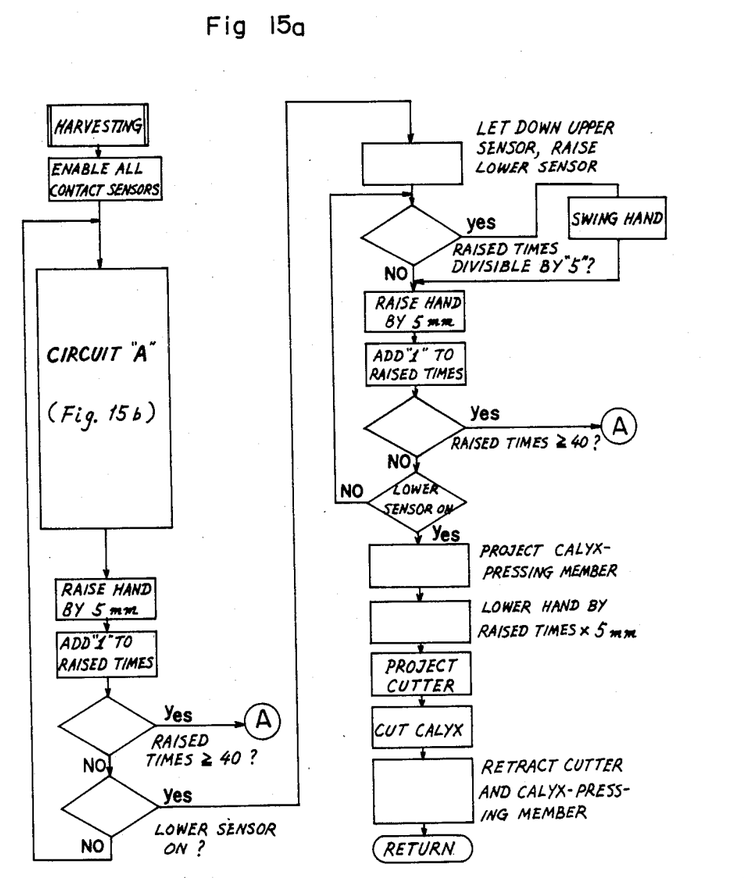
Figure 15B:
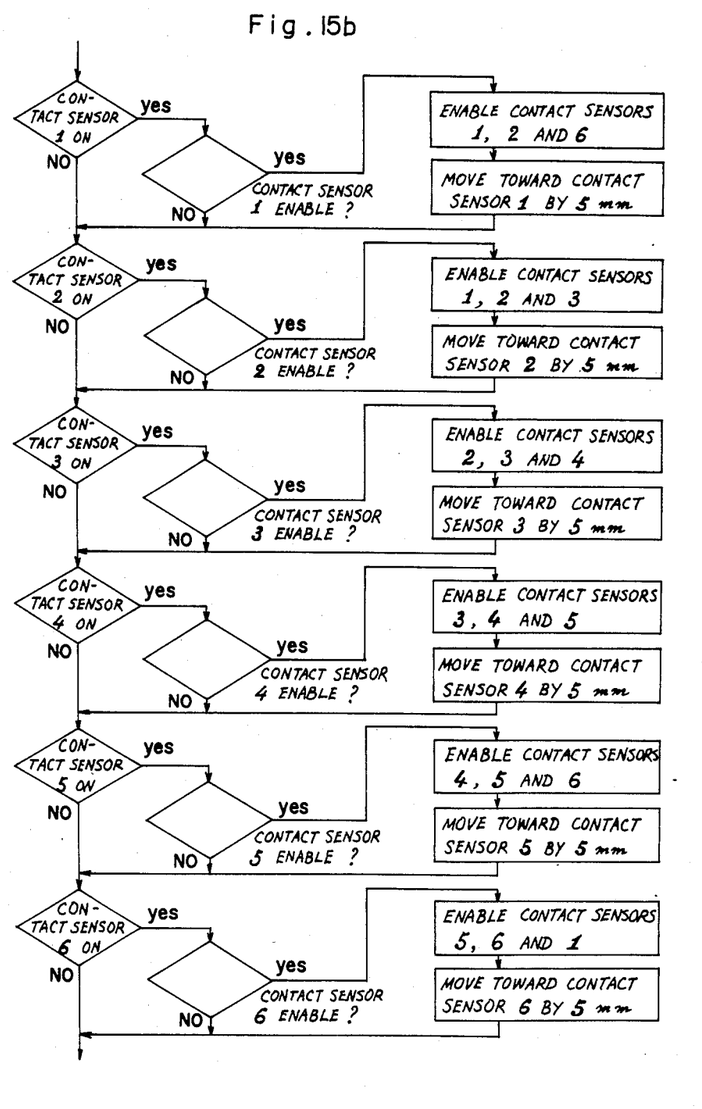

Referring to the flow charts of FIGS. 15a and 15b, when the upper sensor sends a detection signal while the hand element H is raised as described hereinbefore, the upper sensor 128 is retracted to the inoperative position and the lower sensor 130 is brought to the operative position at the same time. When the lower sensor 130 sends a detection signal while the hand element H is raised further, the upward movement of the hand element H is stopped and the calyx pressing members 114 and the cutter 115 are oscillated upwardly. Then the cutter 115 is actuated to cut the calyx.

When any one of the contact sensors S1 to S6 at the tip ends of the fingers F1 to F6 sends a detection signal instead of the upper sensor 128 sending the detection signal while the hand element H is raised with the upper sensor 128 in the operative position, the hand element H is moved horizontally in the direction of the contact sensor that has sent the detection signal, in order that the fruit is taken in through the opening defined by the fingers F1 to F6 in a positive manner. When the upper sensor 128 does not give a detection signal after the hand element H is raised a predetermined amount, it is decided that harvesting is not possible and the hand element H is returned to the predetermined position.

When the hand element H is raised with the lower sensor 130 in the operative position, the hand element H is oscillated each time the hand element is raised a predetermined amount, in order that the fruit is properly placed inside the hand element H. When the lower sensor 130 does not give a detection signal after the hand element H is raised a predetermined amount, it is decided that harvesting is not possible and the hand element H is returned to the predetermined position.

The objective fruit is separated from other fruits or branches by lowering the hand element H by the amount that hand element H has been raised with the lower sensor 130 in the operative position, after the calyx presing members 114 are brought into position to press the calyx and before the cutter 115 assumes the fully projecting position.

The reaped fruit is discharged from the hand H upon switching of the positions of the two sensors 128 and 130 after the hand element H is returned to a predetermined position adjacent the machine.

In working the present invention, various modifications may be effected to the specific construction of the fruit harvesting hand element H, the specific construction of the image pickup means, and the specific constructions of means to detect a direction of fruit and means to automatically move the hand element H which constitute the hand element guiding mechanism.

Various modifications may also be effected to the mechanism for moving the first and second contact sensors 128 and 130 and to the interlocking structure between the actuator 133 and the two sensors 128 and 130.

I claim:

1. A fruit harvesting robot hand comprising;
   a movable arm having an end portion,
   a fruit intake case having an opening and articulatably attached to said end portion of said arm,
   contact sensor means arranged around said opening of said case for detecting a position of fruit to be harvested,
   a calyx cutter projectable and retractable relative to said opening in said case,
   at least one fruit detecting sensor mounted on a support means within said case so as to be movable axially relative thereto, and
   the fruit detecting sensor is movable between a first position in an upper portion of said case arranged to act as a centering sensor for centering said case relative to the fruit to be harvested and a second position in a lower portion of said case arranged to act as an intake completion sensor for detecting completion of fruit intake.

2. A fruit harvesting robot hand as claimed in claim 1, wherein the support means upon which the fruit detecting sensor is mounted is movable by a cylinder disposed axially of said case.

3. A fruit harvesting robot hand as claimed in claim 1, wherein the contact sensor means includes rubber finger members inflatable by air supplied thereto, said rubber finger members further including contact sensor means.

4. A fruit harvesting robot hand as claimed in claim 2, wherein the contact sensor means includes rubber finger members inflatable by air supplied thereto, said rubber finger members further including contact sensor means.

5. A fruit harvesting robot hand as claimed in claim 1 wherein the fruit detecting sensor is further movable to an inoperative position retracted outwardly of the fruit intake case, and the fruit intake case has a cylindrical shape to permit passage of the fruit therethrough.

6. A fruit harvester as claimed in claim 1, wherein said support means comprises a disc-like element.

7. A fruit harvesting robot hand as claimed in claim 6, further wherein the contact sensor means includes rubber finger members inflatable by air supplied thereto.

8. A fruit harvesting robot hand as claimed in claim 6, further wherein said fruit intake case has a cylindrical shape to permit passage of fruit therethrough.

9. A fruit harvesting robot hand as claimed in claim 7, further wherein said contact sensor means comprises contact sensors attached to ends of said rubber finger members.

10. A fruit harvester comprising;
    a pair of right and left drive wheels,
    a pair of front and rear free wheels,
    a plurality of vertically movable outriggers,
    a swivel deck having an axis,
    a vertically movable lift device having a top end disposed at said axis of the swivel deck,
    a robot hand attached to said top end of said lift device and further including a movable arm, a fruit intake case articulatably attached to an extreme end of the arm, contact sensor means arranged around an opening of the case for detecting a position of fruit to be harvested, a calyx cutter projectable and retractable relative to the opening, and at least one fruit detecting sensor mounted upon a support means disposed within the case and adapted to be movable axially relative to the case, and
    the fruit detecting sensor is movable between a first position in an upper portion of the case to act as a centering sensor for centering the case relative to the fruit to be harvested and a second position in a lower portion of the case to act as an intake completion sensor for detecting completion of fruit intake.

11. A fruit harvester as claimed in claim 10, wherein the support means upon which the fruit detecting sensor is mounted is movable by a cylinder disposed axially of the case.

12. A fruit harvester as claimed in claim 10, wherein the contact sensor means includes rubber finger members inflatable by air supplied thereto, said rubber finger members further including contact sensor means.

13. A fruit harvester as claimed in claim 11, wherein the contact sensor means includes rubber finger members inflatable by air supplied thereto, said rubber finger members further including contact sensor means.

14. A fruit harvester as claimed in claim 10 wherein the fruit detecting sensor is further movable to an inoperative position retracted outwardly of the fruit intake case, and the fruit intake case has a cylindrical shape to permit passage of the fruit therethrough.

15. A fruit harvesting robot hand comprising;
    a movable arm,
    a fruit intake case having an opening and articulatably attached to an extreme end of the arm,
    contact sensor means arranged around said opening of said case for detecting a position of fruit to be harvested,
    a calyx cutter projectable and retractable relative to said opening in said case,
    an upper fruit detecting sensor mounted on the case and arranged to be movable between a position directly over the opening of the case and an inoperative retracted position outwardly of the case, and
    a lower fruit detecting sensor mounted on the case to be movable between a position in the case and an inoperative retracted position outwardly of the case,
    wherein the upper sensor acts as sensor for centering the case relative to the fruit, and the lower sensor acts as sensor for detecting completion of fruit intake.

* * * * *